United States Patent [19]

Taylor

[11] Patent Number: 4,638,641

[45] Date of Patent: Jan. 27, 1987

[54] TRANSPORT REFRIGERATION UNIT WITH EVAPORATOR FAN DRIVE USING RAM AIR PRESSURE

[75] Inventor: David H. Taylor, Bloomington, Minn.

[73] Assignee: Thermo King Corporation, Minneapolis, Minn.

[21] Appl. No.: 703,167

[22] Filed: Feb. 19, 1985

[51] Int. Cl.[4] .................... B60H 1/32

[52] U.S. Cl. .................... 62/180; 62/236; 62/241; 62/323.4

[58] Field of Search .................... 62/239, 241, 236, 429, 62/180, 323.4; 417/237, 374, 319, 323, 223; 98/116, 69, 72

[56] References Cited

U.S. PATENT DOCUMENTS

| | | | |
|---|---|---|---|
| 607,321 | 7/1898 | Abbott | 62/239 |
| 682,872 | 9/1901 | Jobson | 62/239 |
| 1,935,590 | 11/1933 | Gorman | 62/24 |
| 1,965,171 | 7/1934 | Boyer | 98/72 |
| 1,969,151 | 8/1934 | Plew | 98/2 |
| 2,503,250 | 4/1950 | Eckert | 62/136 |
| 2,767,561 | 10/1956 | Seeger | 62/136 |
| 2,780,928 | 2/1957 | Bullock | 62/117 |
| 2,916,890 | 12/1959 | Stein | 62/133 |
| 3,512,373 | 5/1970 | White | 62/236 X |
| 3,545,222 | 12/1970 | Petranek | 62/236 |
| 3,786,652 | 1/1974 | Bolynn | 62/241 X |
| 4,348,871 | 9/1982 | Androff | 62/239 |
| 4,394,818 | 7/1983 | Brownfield et al. | 62/239 |

*Primary Examiner*—William E. Wayner

*Attorney, Agent, or Firm*—D. R. Lackey

[57] ABSTRACT

A transport refrigeration unit of the mechanical refrigeration type and including a start-stop mode of operation is driven by an engine 20 which is coupled through belt 34 to a common shaft 32 for the condenser fan 26 and evaporator fan 30, through a clutch 38 which is selectively operable to drive the shaft 32 when the engine 20 is operating, and to decouple from the shaft 32 when the engine 20 is not operating so that ram air pressure to the condenser fan will in turn drive the evaporator fan to provide at least some air circulation in the interior space of the trailer.

1 Claim, 4 Drawing Figures

TRANSPORT REFRIGERATION UNIT WITH EVAPORATOR FAN DRIVE USING RAM AIR PRESSURE

BACKGROUND OF THE INVENTION

This invention pertains to the art of transport refrigeration, and particularly to that aspect related to an arrangement for maintaining circulation of air within a conditioned trailer or like container.

One increasingly popular mode of control for transport refrigeration units is one in which the control not only provides for modulating control such as high and low cooling and heating, but also provides for automatic stopping and starting of the internal combustion engine driving the refrigerant compressor. One known arrangement which includes a stop-start mode of operation is disclosed in U.S. Pat. No. 4,419,866. As is well known in the art, the operation of the engine is stopped when the temperature in the conditioned trailer is in what is commonly called a null band, in which the thermal requirements of the trailer are basically satisfied.

Since typicaly the evaporator fan within the conditioned trailer is driven by power from the engine, when the engine is stopped, air circulation within the trailer from the evaporator fan is also stopped. This lack of air circulation within the trailer can lead to air stratification or pockets of air, or both, where the temperature is well beyond the desired temperature range of the trailer.

The aim of this invention is to provide an arrangement for a transport refrigeration system of the mechanically refrigerated type in which air circulation can be obtained during a null period by taking advantage of the ram air pressure effect created by trailer movement. While the particular arrangement for accomplishing this with the invention with a particular kind of transport refrigeration unit will be later herein developed, it is noted that the general idea of using RAM air pressure to obtain ventilation by causing an interior fan to circulate air is not new. This is evidenced by U.S. Pat. Nos. 682,872; 607,321; 1,935,590; and 1,969,151. However, none of these systems deal with modern, combustion engine driven, transport refrigeration system such as are currently used.

SUMMARY OF THE INVENTION

In accordance with the invention, a transport refrigeration unit mounted on the front face of a trailer and adapted to supply conditioned air to the interior of the trailer, is of the mechanical refrigerant type having a refrigerant evaporator interiorly of the trailer and a refrigerant condenser forwardly of the front face of the trailer and in general front to rear alignment, with an evaporator fan and condenser fan on a common shaft between the evaporator and condenser. An interanal combustion engine drives a refrigerant compressor and is coupled to drive a common shaft, the transport refrigeration unit including means selectively coupling the engine to drive the common shaft in a direction to draw exterior air through the condenser when the engine operates, an uncoupling the shaft from the engine when the engine is not operating, the condenser fan being a propeller fan so that with the vehicle moving forwardly and with the shaft being uncoupled, the ram air pressure effect on the condenser fan drives it and in turn, the evaporator fan to effect at least limited air circulation in the trailer when the engine is not operating.

In another embodiment of the invention, an arrangement is provided in which the fans may be operated even though the internal combustion engine is stopped and the trailer is not moving.

DRAWING DESCRIPTION

All of the figures are in part schematic for the purpose of illustrating the principles of the invention while omitting unessential details.

DESCRIPTION OF THE PREFERRED EMBODIMENTS

Figure 1:
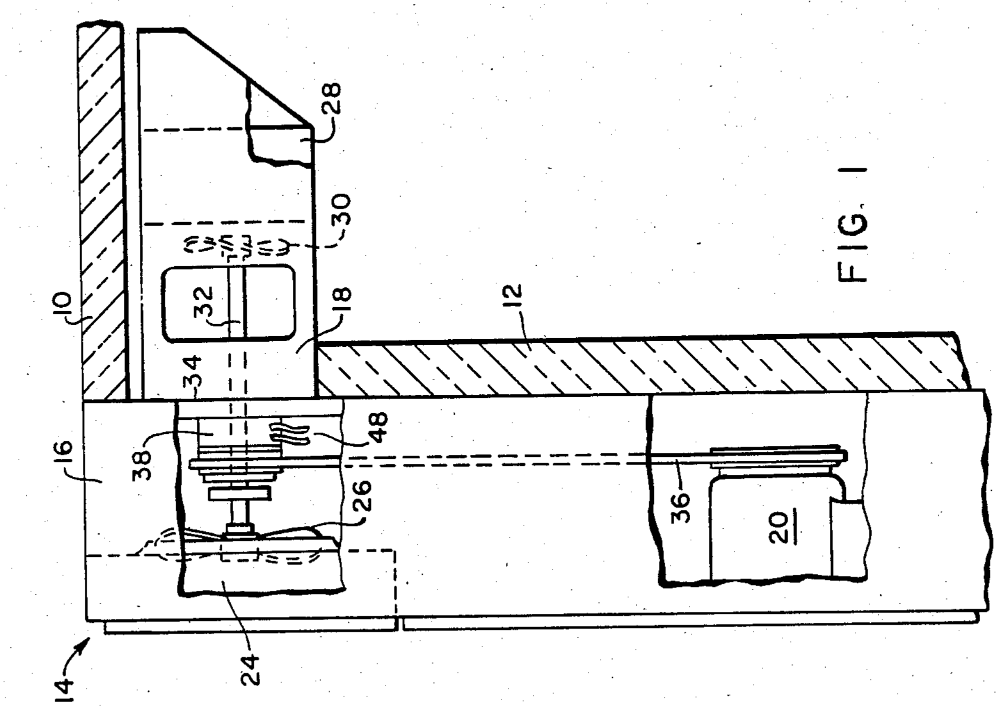
FIG. 1 is a partly-broken side view of a typical transport refrigeration unit provided with the invention.
Figure 2:
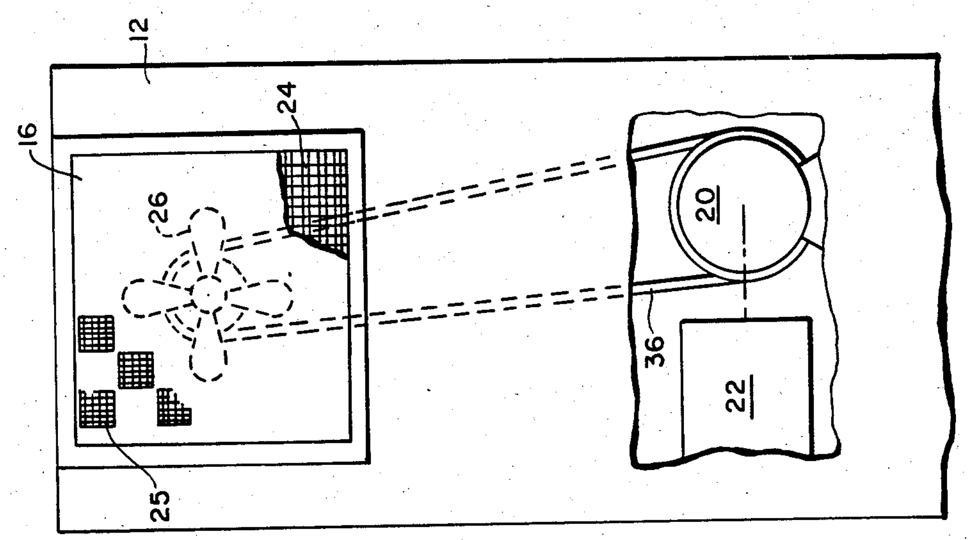
FIG. 2 is a partly-broken front view of the unit.

Referring to FIGS. 1 and 2, the trailer or like vehicle 10 adapted to transport perishable food products and the like includes a front wall 12 upon which the transport refrigeration unit generally designated 14 is mounted. The unit includes an exterior section 16 and an interior section 18 which projects into the upper front corner of the trailer.

The exterior section 16, FIGS. 1 and 2, contains an internal combustion engine 20 driving a refrigerant compressor 22, a condenser 24 mounted at the upper forward face of the external section behind a grille 25 and is served by a propeller fan 26 which, when operating draws exterior air from front-to-rear through the condenser 24 and into the external section 16.

The internal section 18 contains a refrigerant evaporator 28 served by a refrigerant fan 30 which draws air from the interior of the trailer and directs it through the evaporator back into the trailer interior to condition it.

Both the condenser fan 26 and evaporator fan 30 are mounted on a common shaft 32 which passes through the unit bulkhead 34 provided with suitable supports and bearings to properly support the shaft and fans. As shown in FIG. 1, the condenser 24 and evaporator 28 are in general front-to-rear alignment which accommodates the two fans serving these coils being upon a common shaft 32.

The common shaft driving the fans is driven, directly or indirectly, by the engine 20 through a belt 36 extending to clutch means 38 which functions, selectively, to connect the belt to drive the shaft 32 when the engine 20 is operating, and to decouple the belt from driving the shaft 32 when the engine is not operating. As noted previously, some modern transport refrigeration units have control arrangements, as for example in U.S. Pat. No. 4,419,866, in which the unit can furnish different degrees of cooling and heating as well as a null operation in which the engine is stopped. When the engine is stopped, and the clutch 38 is decoupled from driving the shaft, the shaft is free to turn independent of engine operation, and under these conditions and with the trailer moving forwardly, the ram air flowing through the condenser 24 drives the propeller fan 26, which rotation is transmitted through the shaft 32 to the evaporator fan 30 which rotates to circulate some air about the interior of the trailer to avoid air stratification of pockets of air, or both. It will be appreciated, of course, that during such stopped engine operation, the temperature control sensor which controls the operation of the refrigeration system as a whole may well be sensing a temperature within the null band range, even though at other places in the trailer, the temperature is well out of the null band range.

Figure 3:
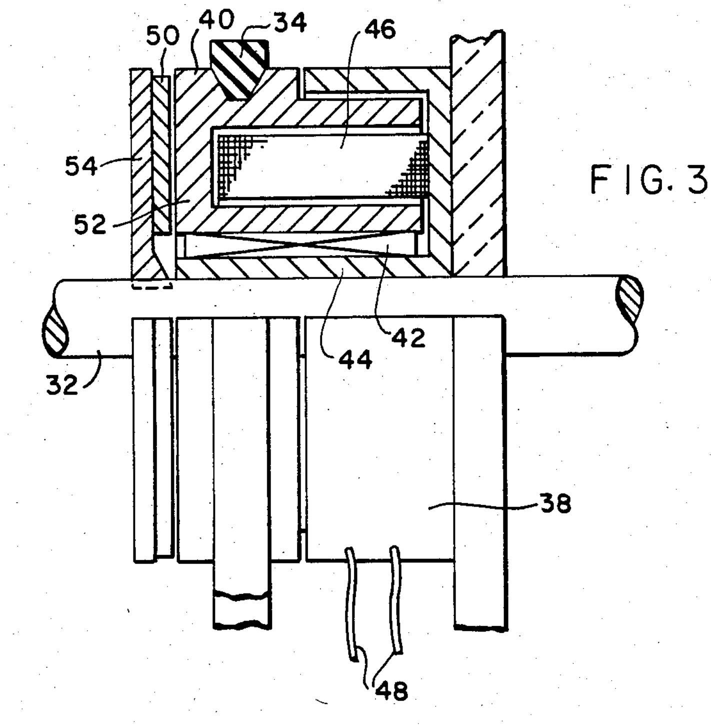
FIG. 3 is a fragmentary, partly-broken and sectioned view of one type of clutch usuable in the invention.

Various types of clutches may be used to carry out the invention including electric, centrifugal, or those of the over-running type. For purposes of example herein, the clutch 38 is illustrated as an electric clutch and is shown somewhat schematically in FIG. 3. The schematic illustration of the clutch 38 in FIG. 3 of the general type disclosed in U.S. Pat. No. 4,187,939 for example. The basic parts of such a clutch include an annular rotor 40 which is suitably journaled as by bearings at 42 mounted upon a support nose 44 in which the shaft 32 is also journaled. An annular winding 46 is fixed to the support bracket 44. When the winding 46 is energized as by an electrical signal through the wires 48, a circular disc armature 50 is drawn to the circulation pole plate 52 of the rotor 40 and, since the armature 50 is connected through structure 54 to the shaft 32, the coupling will be made and the shaft 32 will rotate with the armature and the rotor 40. The signal is, of course, provided to the clutch in accordance with whether or not the engine is in a stopped or operating condition.

Figure 4:
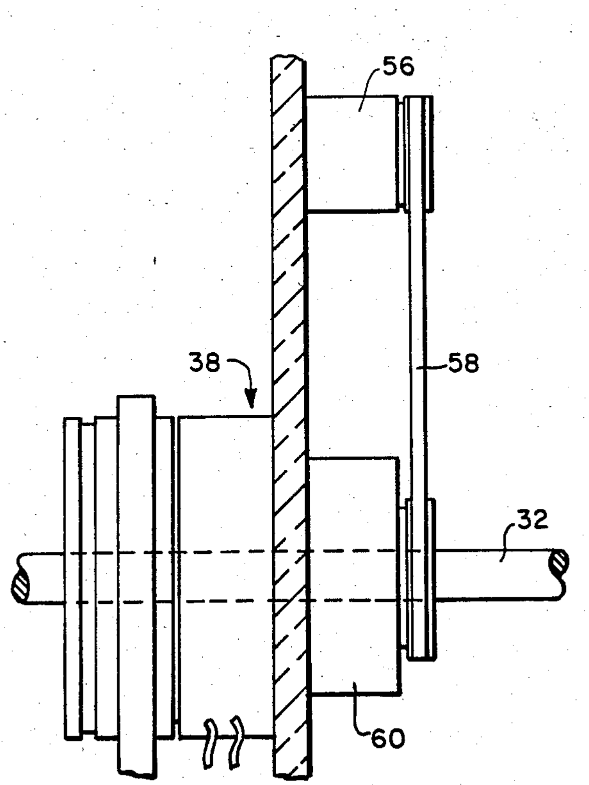
FIG. 4 is a fragmentary view of an arrangement usable to obtain internal trailer air flow when both the engine is stopped, and the trailer is not moving.

Under some conditions, the trailer may be stopped as at a truck stop for any of various reasons while the refrigeration system continues to operate, including in a stop-start mode. In this case, of course, the ram air to drive the evaporator fan independently of engine operation is not available. In the arrangement of FIG. 4, the shaft 32 may still be operated through an independent source of energy as by auxiliary fan drive motor 56 coupled by belt 58 through optional coupling 60 to the shaft 32. The auxiliary fan motor 56 may be driven electrically, or through air or hydraulic means in accordance with the particular source of energy available on the particular transport refrigeration unit and tractor power. It will be understood that when the trailer is stopped and the engine 20 stops, the clutch 38 decouples so that there is no resistance to the drive by the auxiliary motor 56.

I claim:

1. A transport refrigeration system, comprising:

a trailer or like vehicle having an interior defined by an enclosure which includes a front wall;

and a refrigeration unit mounted on said front wall adapted to supply conditioned air to the interior of the trailer;

said refrigeration unit including a refrigerant evaporator in said enclosure; a refrigerant condenser outside said enclosure and forwardly of the front wall; an evaporator fan and a condenser fan on a common shaft which extends through said front wall between the evaporator and condenser; a refrigerant compressor; a prime mover for driving said refrigerant compressor; means selectively operating said prime mover in accordance with the temperature condition in said trailer, with said prime mover being off when the temperature is in a null band; and coupling means for selectively coupling and uncoupling said prime mover and said common shaft, said coupling means coupling said prime mover means and said common shaft when said prime mover is operating, to drive said common shaft and cause the condenser and evaporator fans to move exterior and interior air respectively through said condenser and said evaporator, and uncoupling said prime mover and said common shaft when said prime mover is not operating;

said condenser fan being a propeller fan so that when the trailer moves forwardly with said common shaft uncoupled from said prime mover, the ram air pressure effect drives the condenser fan, and in turn the evaporator fan, to effect at least limited air circulation in the interior of said trailer while the temperature condition is in said null band.

* * * * *